US009634857B2

(12) United States Patent
Lamb et al.

(10) Patent No.: US 9,634,857 B2
(45) Date of Patent: Apr. 25, 2017

(54) AUXILIARY CHANNEL REMOTE DEVICE MANAGEMENT, DIAGNOSTICS, AND SELF-INSTALLATION

(71) Applicant: AVAGO TECHNOLOGIES GENERAL IP (SINGAPORE) PTE. LTD., Singapore (SG)

(72) Inventors: Lowell D. Lamb, San Ramon, CA (US); Glen Kramer, Petaluma, CA (US); Pierre Couillaud, Vancouver (CA); John Kevin Markey, San Diego, CA (US); John Stuart Walley, Ladera Ranch, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/541,907

(22) Filed: Nov. 14, 2014

(65) Prior Publication Data
US 2015/0140986 A1     May 21, 2015

Related U.S. Application Data

(60) Provisional application No. 61/904,878, filed on Nov. 15, 2013.

(51) Int. Cl.
| | |
|---|---|
| *H04M 3/00* | (2006.01) |
| *H04L 12/28* | (2006.01) |
| *H04L 12/24* | (2006.01) |

(52) U.S. Cl.
CPC ...... *H04L 12/2898* (2013.01); *H04L 41/0659* (2013.01)

(58) Field of Classification Search
CPC ..... H04W 84/18; H04W 4/008; H04W 36/36; H04W 88/04; H04W 8/24; H04W 8/245; H04L 43/50; H04L 63/1433; H04L 12/2697; H04L 41/5038; H04L 43/0829; H04L 43/0852; H04L 43/087; H04L 43/12
See application file for complete search history.

(56) References Cited

U.S. PATENT DOCUMENTS

| | | | |
|---|---|---|---|
| 7,925,935 B2 | 4/2011 | Sorbara et al. | |
| 2007/0053351 A1* | 3/2007 | Kalogridis | H04W 92/02 370/386 |
| 2012/0320789 A1 | 12/2012 | Wu et al. | |
| 2013/0031982 A1 | 2/2013 | Sato et al. | |

(Continued)

OTHER PUBLICATIONS

U.S. Appl. No. 13/974,485, Notice of Allowance, Oct. 9, 2015, pp. 1-17, U.S. Patent and Trademark Office, Alexandria, Virginia.

(Continued)

*Primary Examiner* — Kwasi Karikari
(74) *Attorney, Agent, or Firm* — Oblon, McClelland, Maier & Neustadt, L.L.P.

(57) ABSTRACT

A remote device management, diagnostics, and self-installation architecture employs multiple wireless links, which may include a local wireless link and a remote wireless link. The architecture employs cellular channels for remote management of customer premises equipment (CPE). Within the architecture, test devices may operate on the CPE. As examples, the test devices may include a cellular radio, or the test devices may be in communication with another device that includes the cellular radio.

20 Claims, 8 Drawing Sheets

(56) References Cited

U.S. PATENT DOCUMENTS

2013/0196600 A1* 8/2013 Capers .................. H04W 24/06
                                                        455/41.2
2015/0016241 A1    1/2015 Ruffini et al.

OTHER PUBLICATIONS

U.S. Appl. No. 13/974,485, Claims, Sep. 2, 2015, pp. 1-7, U.S. Patent and Trademark Office, Alexandria, Virginia.
DSL Expresse Pro, ASSIA Incorporated, Redwood City, California, Copyright 2012, 2 pages.
DSL Expresse Pro, "The power of DSL Expresse in a mobile app," ASSIA, Inc., 2013, 2 pages.
Press Releases: ASSIA Announces Smartphone App for Quick and Easy DSL Diagnostics and Optimization, Business Wire India, Sep. 21, 2011, 1 page.
DSL Expresse, "Take Your DSL Further, Faster and into the Future," Rev. 060413, ASSIA, Inc., 2012, 4 pages.

* cited by examiner

AUXILIARY CHANNEL REMOTE DEVICE MANAGEMENT, DIAGNOSTICS, AND SELF-INSTALLATION

PRIORITY CLAIM

This application claims priority to provisional application Ser. No. 61/904,878, filed Nov. 15, 2013, which is entirely incorporated by reference.

TECHNICAL FIELD

This disclosure relates to management, diagnostics, and self-installation of devices at locations that are remote from an operations center for a service provider.

BACKGROUND

Rapid advances in electronics and communication technologies, driven by immense customer demand, have resulted in the widespread adoption of an extremely broad array of electronic devices in every aspect of society. For example, some estimates put the number of subscriber connections for cellular phones in use around the world at nearly 80% of the world's population. As another example, broadband Internet access is commonly available in the home, and provisioned with customer premises equipment such as DSL and cable modems, wireless routers, and network devices such as switches and hubs. It can be quite costly for a service provider to perform a service call and send a technician to the customer site for troubleshooting.

DETAILED DESCRIPTION

Figure 1:
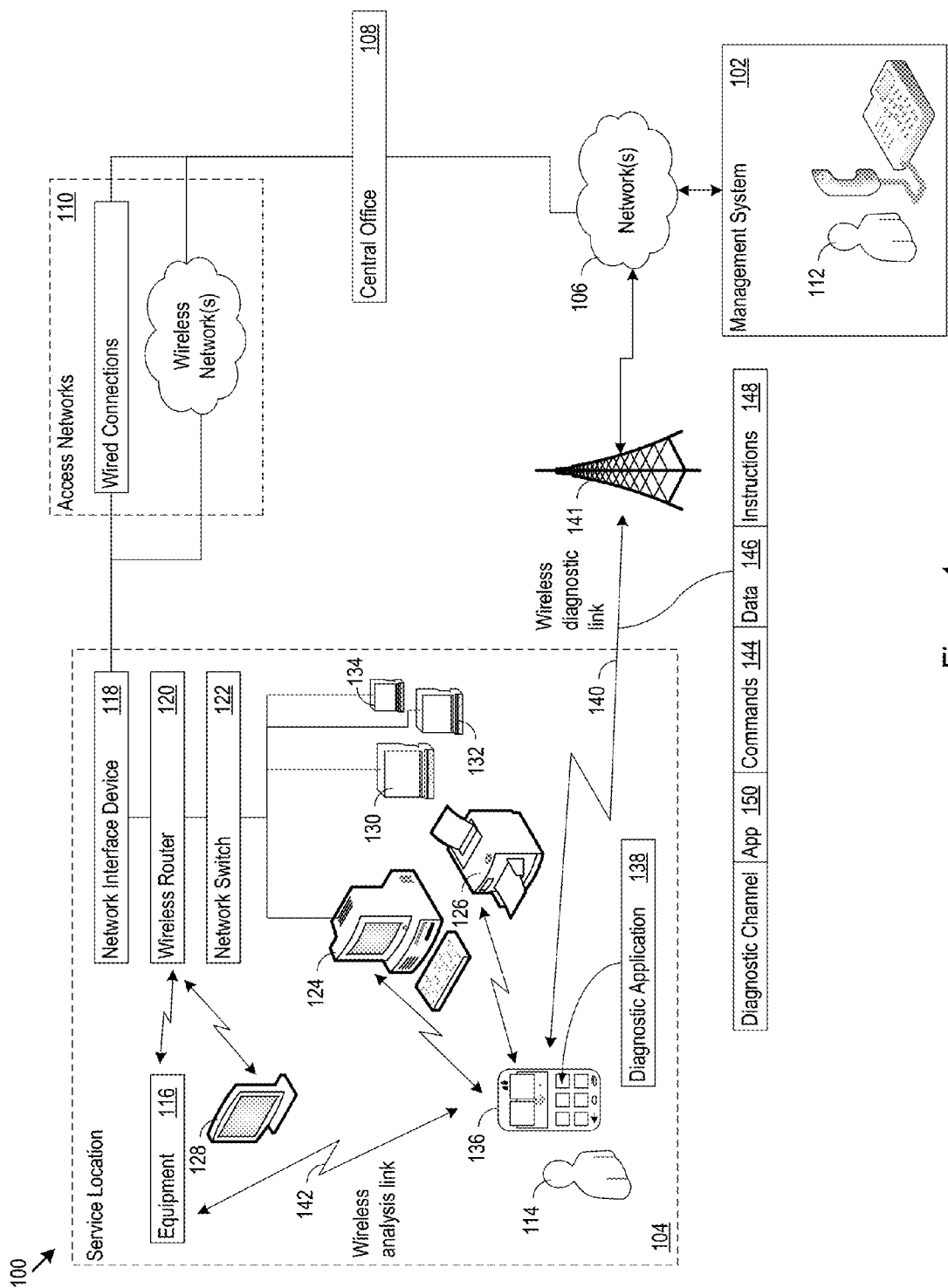
FIG. 1 shows an example network diagram.

FIG. 1 shows an example network 100 that shows a management system 102 in communication with a service location 104. The network 100 is one of many possible examples of architectures applicable to the management techniques discussed below. The network 100 connects the management system 102 to the service location 104 through one or more intermediate networks 106. In the path toward the service location 104 there may be, for example, a central office 108, and an access network 110.

As just one example, the management system 102 may be a facility associated with a network operator who provides any combination of services to customers, such as voice services, Internet (or other data) services, and phone services. The management system 102 may connect through the networks 106 to a central office 108. The central office 108 in turn connects to the service location 104 through access networks 110 which may include phone lines (e.g., for DSL Internet service), cable lines (e.g., for Cable Internet service), Radio Frequency (RF), Satellite, microwave, or other links. The service location 104 may be a home, a business, a government location, or other location that obtains services from the network operator.

At the management system 102, technicians 112 may be employed to help an individual 114 present at the service location 104 (e.g., a customer in their home) troubleshoot equipment at the service location 104. The management system 102 may be local or remote with respect to the service location 104. Further, while the management system 102 may be associated with the network operator, other third party management systems may also provide the same or similar functionality. For example, the manufacturer of a DVR or any other type of device may operate its own management system, and provide a configuration or maintenance service to purchasers of its devices. Regardless of the location of the management system 102, or the entity operating the management system 102, it may be economically costly to perform a service call to send a technician to the service location 104 to assist with troubleshooting. The techniques described below help avoid the cost of a service call, and have other advantages as well.

At the service location 104 there may be many different types of equipment 116, any of which may be subject to management actions by the management system 102. The management actions may include actions such as troubleshooting, configuration, and software and firmware upgrades, as examples. Continuing the example of the network operator, the service location 104 may include equipment such as a network interface device 118 (e.g., a DSL modem or cable modem), a wireless router 120, and a network switch 122. Additional examples of equipment include the computers 124, printers 126, displays 128, network attached storage (NAS) 130, scanners 132, and game systems 134 connected to the network either wirelessly or in a wired manner, e.g., via Ethernet.

At the service location 104, the individual 114 interacts with a diagnostic device 136. The diagnostic device 136 may run a diagnostic application 138. As one example, the diagnostic device 136 may be a smartphone with multiple communication interfaces. The diagnostic device 136 may, for example, communicate over a first wireless link 140, in some instances referred to below for clarity as a wireless diagnostic link. The first wireless link 140 may be, as examples, a cellular telephony link (e.g., a GSM, 2G, 3G, or 4G/LTE link) or a Voice over Internet Protocol (VoIP) link to a cellular base station 141 that is also in communication with the management system 102. The diagnostic device 136 may also communicate with any of the equipment at the service location 104 using a second wireless connection 142, in some instances referred to below for clarity as a wireless analysis link. As examples, the second wireless connection 142 may be a Bluetooth™ connection, a Near Field Communications (NFC) connection, a wireless network (WiFi) connection, a WiFi direct link, or another type of wireless connection.

The second wireless connection may be a local link in the sense that it exists between the diagnostic device 136 and a particular piece of equipment in the service location 104. The first wireless link may be a remote link in the sense that it connects the diagnostic device 136 to the possibly more distant management system 102. For the purposes of discussion below, the first wireless link (e.g., a cellular telephony link) is referred to as a wireless "diagnostic" link. The second wireless link (e.g., a Bluetooth™ link) is referred to as a wireless "analysis" link.

In that regard, the wireless diagnostic link may transmit and receive, as examples, management commands 144, management data 146, and management instructions 148.

The management commands 144 may, as a few examples, instruct the diagnostic device 136 to connect to a piece of equipment, run a test on the equipment, gather data from the equipment, install firmware on the equipment, or set configuration settings on the equipment. The management data 146 may provide the configuration settings, the firmware, or specify data for the tests, as examples to the diagnostic device 136 and the equipment 116. The management data 146 going back to the management system 102 may include, the test results, configuration parameters, current firmware version, video or audio captured by the diagnostic device (e.g., through an onboard camera and microphone), and other data characteristic of the Device Under Test (DUT) that the diagnostic device 136 may sense, or that the DUT may report, e.g., temperature, fan speed, up-time, OS or other software version, service performance data (e.g., data rate, error rate, latency, jitter, and the like) port status, model number, serial number, link status, memory configuration, and other equipment characteristics. The management instructions 148 may specify operations for the individual 114 to perform, such as install or run the diagnostic application 138, bring the diagnostic device within local wireless range of the DUT, or perform specified actions on the equipment, as examples.

The wireless diagnostic link may also push a diagnostic application 150 to the diagnostic device 136. In that respect, the management system 102 may cause transmission of the diagnostic application 150 over the first wireless link 140 to the diagnostic device 136 (e.g., to a smartphone). The management system 102 may also instruct the diagnostic device 136 to install and execute the diagnostic application.

As one example, the wireless analysis link may operate according to Android™ operating system (OS) NFC technologies such as Android Beam or S-Beam. The diagnostic device 136 may thereby, for example, use NFC to initiate Bluetooth™ operation on the equipment and the diagnostic device 136, pair them, perform management actions, and disable the Bluetooth™ link once the management actions are complete.

One use case is that the individual 114 detects, for example, a network fault and calls the management system 102 for their network operator, e.g., on the individual's smart phone, thereby establishing the diagnostic link. On the call, the technician 112 attempts to manage the network interface device 118 using the access network 110. If the technician 112 is unsuccessful, then the technician 112 may push the diagnostic application 150 to the smartphone. The technician 112 may then instruct the individual 114, e.g., via the voice connection, or through instructions delivered through the diagnostic application 150, to stand within Bluetooth™ range of the network interface device 118. The smartphone and the network interface device 118 establish a Bluetooth™ link as the analysis link. Once established, the technician 112 may instruct the diagnostic application 150 and the individual 114 to execute management actions on the network interface device 118 to, e.g., find and correct network configuration faults and restore Internet service.

Figure 2:
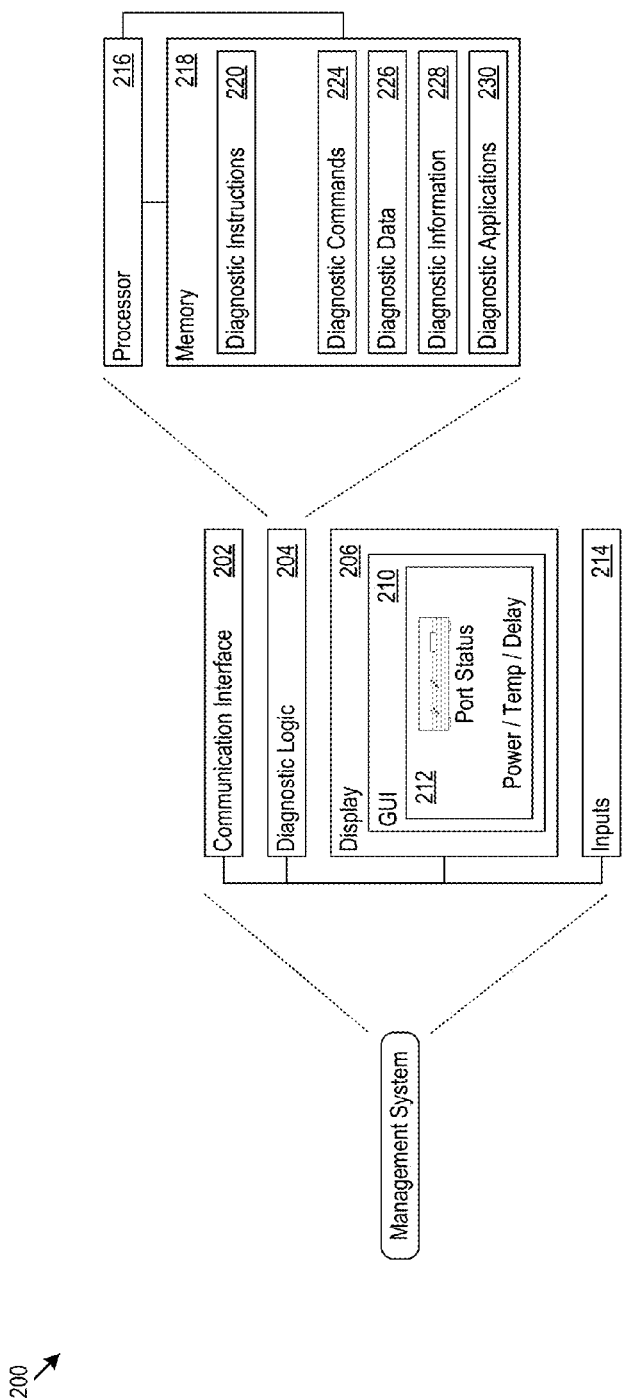
FIG. 2 shows an example management system.

FIG. 2 shows an example management system 200, which illustrates one possible architecture for the management system 102 in FIG. 1. The management system 200 includes a communication interface 202, diagnostic logic 204, and a user interface 206. The communication interface 202 may include one or more Ethernet ports, cellular telephony interface, or any other type of wired or wireless communication interface for performing the communications described above with respect to FIG. 1. The communication interface 202 sends and receives, e.g., the management commands 144, management data 146, as well as management instructions 148 and the diagnostic application 150.

The user interface 206 may display, for example, a graphical user interface (GUI) 210. The user interface 206 may process any of the management commands 144, management data 146, and management instructions 148, or any other data, and display through the GUI 210 any type of equipment management interface 212, such as a troubleshooting interface, configuration interface, or upgrade interface. The equipment management interface 212 may visualize, as just a few examples, configuration settings, port activity and status, software versions, port parameters, or any other data concerning the DUT. The equipment data drives the visualization, analysis, and management of the equipment, which the diagnostic logic 204 may carry out. The user inputs 214 provide keyboard, mouse, voice recognition, touchscreen, and any other type of input mechanisms for technician interaction with the management system 200.

The diagnostic logic 204 may be implemented in hardware, software, or both. In one implementation, the diagnostic logic 204 includes one or more processors 216 and memories 218. The memory 218 may store diagnostic instructions 220 (e.g., program instructions) for execution by the processor 216. The diagnostic instructions 220 may carry out equipment management using the local and remote wireless links. The diagnostic instructions 220 may generate the GUI 210. The diagnostic instructions 220 may also receive diagnostic input from the GUI 210 and in response generate and send or receive diagnostic commands 224, diagnostic data 226, diagnostic information 228, and diagnostic applications 230 to and from the diagnostic device 136. The management system 102 may store a library of diagnostic applications, any of which it may push to the diagnostic device 136 and that is suitable for particular types of equipment (e.g., a DSL modem diagnostic app, and a color laser printer diagnostic app), types of problems encountered (e.g., loss of Internet connectivity, or inability to connect to a wireless router), or types of management actions to perform (e.g., to upgrade firmware, or run periodic maintenance checks).

In other implementations, the diagnostic instructions 220 implement an automated response system. That is, it is not necessary for a live technician 112 to be available to assist the individual 114. As one example, the automated response system may include a voice recognition system that facilitates voice driven troubleshooting with the individual 114. In other implementations, the diagnostic instructions 220 may implement interactive touch-tone menu functionality for troubleshooting, optionally including Interactive Voice Response (IVR) functionality.

Figure 3:
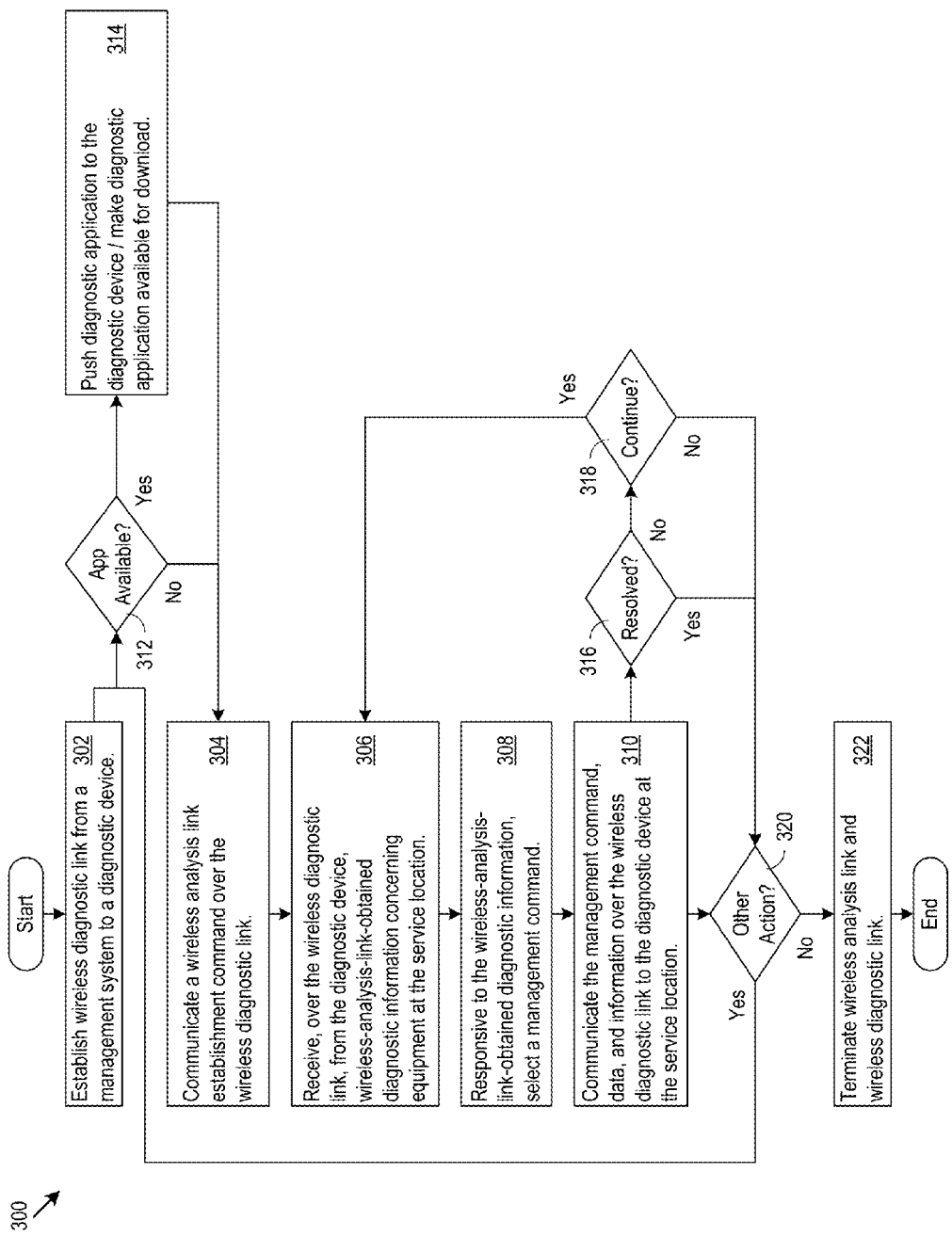
FIG. 3 shows an example of logic that may be executed at the management system.

FIG. 3 shows an example of logic 300 that may be executed at the management system 102, e.g., as the diagnostic instructions 220. The logic 300 includes establishing a wireless diagnostic link to a diagnostic device (302). The wireless diagnostic link may be a cellular telephony link, for example, over which an individual 114 may communicate with a technician 112. When the individual 114 has a diagnostic device 136 available, the logic 300 may determine whether a diagnostic application is available for handling the issue at hand (312). If so, the logic 300 may make available a diagnostic application 138 to the diagnostic device 136 (314). For example, the logic 300 may automatically push the diagnostic application 138 to the diagnostic device 136, may provide instructions to the individual 114 for downloading the diagnostic application 138, or may otherwise make the diagnostic application 138 available to the individual 114.

The logic 300 may then communicate a wireless analysis link establishment command over the wireless diagnostic link to the diagnostic device (304). The command may be configured for execution by the diagnostic application 138, for example. Alternatively, the command may be one that that the individual 114 can perform using the existing capability of the diagnostic device 136, such as creating a Bluetooth link to the DUT. The logic 300 also receives, over the wireless diagnostic link, from the diagnostic device, wireless-analysis-link-obtained diagnostic information concerning equipment at the service location (306). In other words, the management system 102 receives information about the DUT that the diagnostic device 136 has obtained through the local wireless analysis link (e.g., the Bluetooth link to the equipment).

Responsive to the wireless-analysis-link-obtained diagnostic information, the logic 300 may select a management command (308). The management command may, as one example, be a troubleshooting action determined by analysis of the diagnostic information in comparison with or with reference to equipment troubleshooting information. The management system 102 may maintain a database of equipment troubleshooting information specific to any particular equipment that the management system 102 handles. The logic also communicates the management command, data, and instructions over the wireless diagnostic link to the diagnostic device 136 at the service location (310). The management action may be, for example, instructions to the individual 114 to perform, may be actions for the diagnostic application 138 to perform, may be actions for the equipment to perform, or may be an action for another entity to perform.

The logic 300 may continue to execute management actions until a particular management goal is resolved (316). The logic 300 may also determine to end the management activity at any time (318). In addition, the logic 300 may perform as many different management actions as desired (320), for example, troubleshooting an Internet connectivity problem, then upgrading DSL modem firmware, then resetting the DSL modem, and then confirming proper Internet connectivity when the DSL modem restarts. When the logic 300 has not further actions to perform, it may send the diagnostic device an instruction to terminate the wireless analysis link, and may also terminate the wireless diagnostic link (322).

Figure 4:
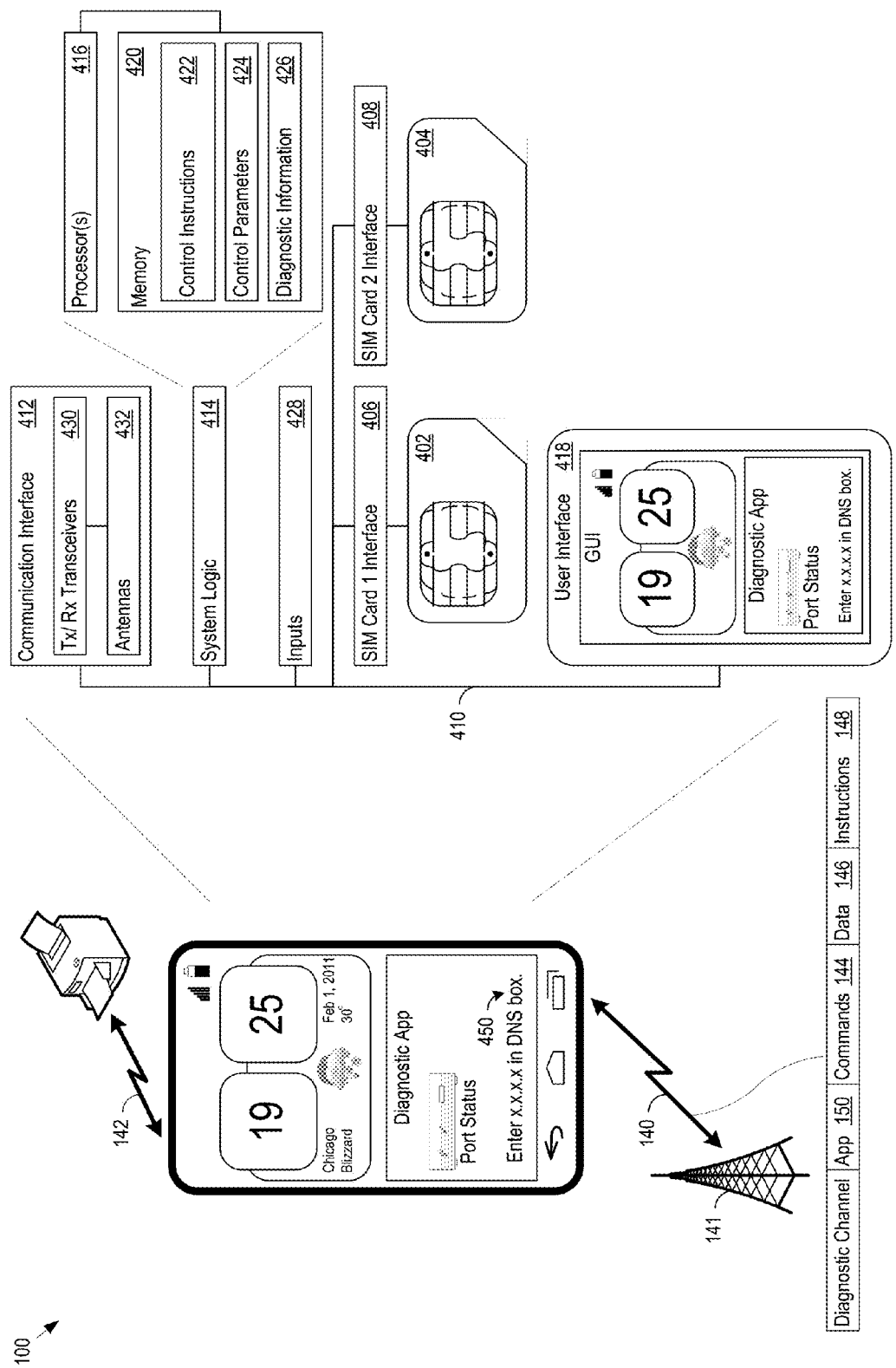
FIG. 4 shows an example of a diagnostic device.

FIG. 4 shows an example of a diagnostic device 400. The diagnostic device 400 is a smartphone in this example, but the diagnostic device may be any electronic device capable of establishing a local wireless connection to DUT. The diagnostic device 400 may support one or more Subscriber Identity Modules (SIMs), such as the SIM1 402 and the SIM2 404. Electrical and physical interfaces 406 and 408 connect SIM1 402 and SIM2 404 to the rest of the user equipment hardware, for example, through the system bus 410.

The diagnostic device 400 includes a communication interface 412, system logic 414, and a user interface 418. The system logic 414 may include any combination of hardware, software, firmware, or other logic. The system logic 414 may be implemented, for example, in a system on a chip (SoC), application specific integrated circuit (ASIC), or other circuitry. The system logic 414 is part of the implementation of any desired functionality in the diagnostic device 400. In that regard, the system logic 414 may include logic that facilitates, as examples, running applications; accepting user inputs; saving and retrieving application data; establishing, maintaining, and terminating cellular phone calls or data connections for, as one example, Internet connectivity; establishing, maintaining, and terminating wireless network connections, Bluetooth connections, or other connections; and displaying relevant information on the user interface 418. The user interface 418 may include a graphical user interface, touch sensitive display, voice or facial recognition inputs, buttons, switches, speakers and other user interface elements.

In the communication interface 412, Radio Frequency (RF) transmit (Tx) and receive (Rx) transceivers 430 handle transmission and reception of signals through the antenna(s) 432. The communication interface 412 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium.

As one implementation example, the communication interface 412 and system logic 414 may include a BCM2091 EDGE/HSPA Multi-Mode, Multi-Band Cellular Transceiver and a BCM59056 advanced power management unit (PMU), controlled by a BCM28150 HSPA+ system-on-a-chip (SoC) baseband smartphone processer or a BCM25331 Athena™ baseband processor. These devices or other similar system solutions may be extended as described below to provide the additional functionality described below. These integrated circuits, as well as other hardware and software implementation options for the diagnostic device 400, are available from Broadcom Corporation of Irvine, Calif.

The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interface 412 may include transceivers that support transmission and reception under the 4G/Long Term Evolution (LTE), Bluetooth, and NFC standards. The techniques described below, however, are applicable to other communications technologies. Accordingly, the transceivers 430 may include transceivers for the 3rd Generation Partnership Project (3GPP), GSM (R) Association, Bluetooth low energy, WiFi direct, 802.11 a/b/g/n/ac, Wireless Gigabit (WiGig), InfraRed (IR), audio (e.g., ultrasonic), Universal Mobile Telecommunications System (UMTS), High Speed Packet Access (HSPA)+, or other communications technologies, partnerships, or standards bodies.

The system logic 414 may include one or more processors 416 and memories 420. The memory 420 stores, for example, control instructions 422 that the processor 416 executes to carry out any of the processing functionality, working in communication with the circuitry in the communication interface 412. For example, the control instructions 422 may include a diagnostic application 138 received from the management system 102 or any other source.

The control parameters 424 provide and specify configuration and operating options for the control instructions 422. The memory 420 may also store diagnostic information 426 obtained from the DUT. Note that the diagnostic information 426 may come over the wireless analysis link 142, e.g., transmitted to the diagnostic device 400 by the DUT. In addition, the diagnostic information 426 may come from other inputs 428 to the diagnostic device 400. Examples of such inputs 428 include microphones, video and still image cameras, temperature sensors, vibration sensors, headset and microphone input/output jacks, Universal Serial Bus (USB)

connectors, memory card slots, radiation sensors (e.g., IR sensors), and other types of inputs.

Figure 5:
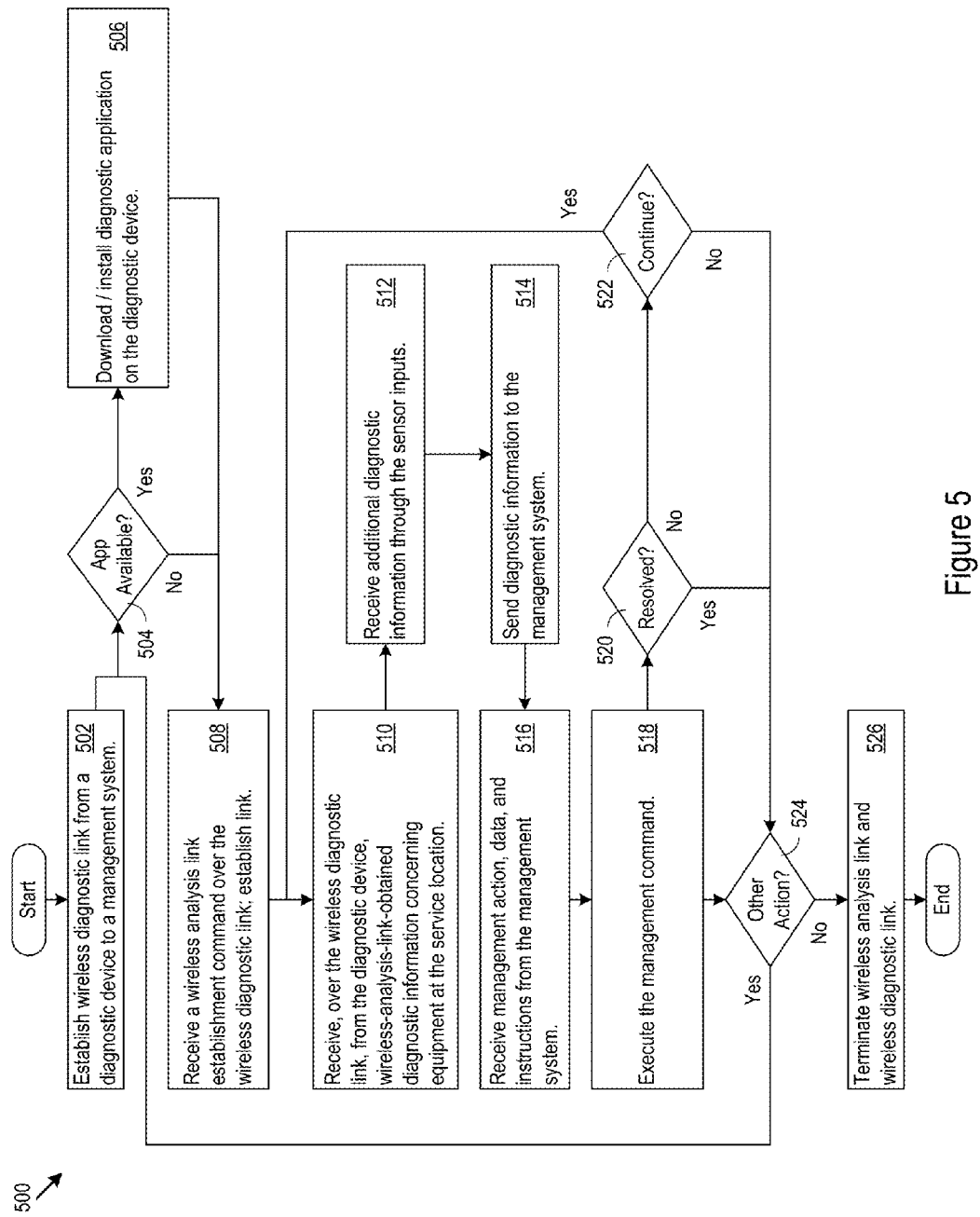
FIG. 5 shows an example of logic that may be executed by the diagnostic device.

FIG. 5 shows an example of logic 500 that may be executed by the diagnostic device, e.g., by the control instructions 422. The logic 500 includes establishing a wireless diagnostic link to a management system (502). The wireless diagnostic link may be a VoIP link, for example, that an individual 114 may use to explain an equipment problem or ask an equipment question to a technician 112.

When there is a diagnostic application available for the particular issue at hand (504), the logic 500 may automatically receive and install the diagnostic application 138 on the diagnostic device 136 (506). Alternatively, the logic 500 may receive instructions provided to the individual 114 for downloading and installing the diagnostic application 138.

The logic 500 receives a wireless analysis link establishment command over the wireless diagnostic link to the management system 102, and establishes the wireless analysis link (508). The command may be a Bluetooth link command, a WiFi direct link command, or other command that establishes a wireless link between the diagnostic device and the equipment at the service location 104. The command may be configured for execution by the diagnostic application 138 or may be an instruction or direction to the individual 114 for establishing the link through the diagnostic application or by using existing capabilities of the diagnostic device 136.

The logic 500 also receives, over the wireless analysis link, from the equipment, wireless-analysis-link-obtained diagnostic information concerning the equipment at the service location (510). In other words, the diagnostic device 136 receives information about the DUT through the local wireless analysis link (e.g., the WiFi Direct link to the equipment). In addition, the diagnostic device 136 may receive additional diagnostic information through the inputs 428, for example, to obtain a picture or a video of the equipment (512).

The logic 500 sends the diagnostic information to the management system 102 (514). In response, the logic 500 may receive a management command, data, and instructions from the management system 102 (516). The management command may be any direction to the individual 114 or the diagnostic application 138. As just a few examples, the management command may be to read configuration settings, to obtain device status, or to read firmware version information. The logic 500 executes the management command (518).

The logic 500 may continue to execute management commands until a particular management goal is resolved (520). The logic 500 may also determine to end the management activity at any time (522). In addition, the logic 300 may perform as many different management actions as desired (524). When the logic 500 has no further actions to perform, it may terminate the wireless analysis link, and may also terminate the wireless diagnostic link (526).

The system described above may have certain technical advantages, including leveraging low cost (e.g., Bluetooth) technologies, with the sophisticated, ubiquitous, consumer-friendly, and highly functional smart phone/cellular network to provide low-cost and powerful management connectivity. The techniques facilitate network operators to transfer many fault isolation and service restoration tasks to the individual 114, thus reducing the number of service calls, and otherwise lowering operational expenses. Further, the management system 102 may centralize manuals, instructional videos, software updates, and other management data in web-based repositories. This may reduce costs for equipment suppliers and network operators and simplify use by end customers. Note that the system described above may provide management connectivity to devices or systems that do not otherwise have fixed-line or short range wireless management connectivity. Examples include, but are not limited to, vehicles, power-grid elements, commercial equipment, or any other equipment not on a fixed-line network. Further, the system uses smartphone resources, such as cameras, to obtain diagnostic data and provide very flexible management functionality.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

Various implementations have been specifically described. However, many other implementations are also possible. For instance, the equipment 116 may take many different forms. As examples, the equipment 116 may be any device equipped with a wireless transceiver (e.g., Bluetooth or WiFi) or wired interface (e.g., USB or a proprietary cabled interface), including a home stereo, television, refrigerator, microwave, exercise machine, washer or dryer, or home security system. As additional examples, the equipment may be an engine controller or diagnostic system in a vehicle, a portable gaming device, an entertainment system in the vehicle, or a climate control system in the home or in the car. Further examples of the equipment include industrial machinery such as robots, assembly lines, welders, drill presses, stamping machines, cutting machines, and the like.

The management instructions 148 may include pictures, diagrams, and videos that the diagnostic application 138 may display to assist the individual 114 in managing the equipment. The diagnostic application 138 may be provided in multiple languages, selectable by the individual 114. The diagnostic application 138 may implement security and authentication mechanisms. One example of such mechanisms include instructing the diagnostic device 136 camera to monitor the LED status indicators on the equipment, detecting a specific pattern of response in the LEDs which has been initiated via the wireless analysis link 142, and determining if the detected LED response is consistent with the expected response before management actions are carried out. Another example is to request that the individual 114 press a button on the equipment to authorize management connectivity.

In other implementations, the management capabilities may be used in a transparent mode. In the transparent mode, the individual 114 may not necessarily be aware that the management system 102 is performing equipment management through the diagnostic device 136. In transparent mode, the diagnostic device 136 may establish the wireless diagnostic link 140 automatically, e.g., when the diagnostic device 136 detects and connects to a nearby piece of equipment. In that scenario, the diagnostic device 136 may regularly perform equipment maintenance (e.g., firmware updates) whenever the diagnostic device 136 is within range of a given piece of equipment.

The transparent mode connectivity and management activities may be initiated and executed remotely, e.g., by a technician or automated system associated with the management system 102. One example use case is for residential broadband services. For example, assume that the network operator detects a fault in fixed-line network (e.g., loses connectivity with home gateway). Without contacting the subscriber, the network operator may attempt to access the home gateway using a wireless diagnostic link management connection. If successful, the network operator isolates the fault and, if possible, restores service. Otherwise, the network operator may send an email/voicemail/text alerting the subscriber of the fixed-line network impairment and recommending a corrective action.

Another example use case is the management of remote industrial equipment. For example, a technician, night watchman, robot, or other entity may move through a facility that contains a number of short-range wireless-enabled (Bluetooth, WiFi, etc.) pieces of equipment. As each such unit comes within range, the diagnostic device 136 automatically connects to it, thus allowing remote management systems to access the unit via the wireless diagnostic link and perform diagnostic and/or management functions. As stated above, the person carrying the smart phone does not need to participate in the connectivity/management activities. One benefit is that in many instances of this scenario, the person with the diagnostic device 136 does not require specialized training that a technician otherwise might need.

Figure 6:
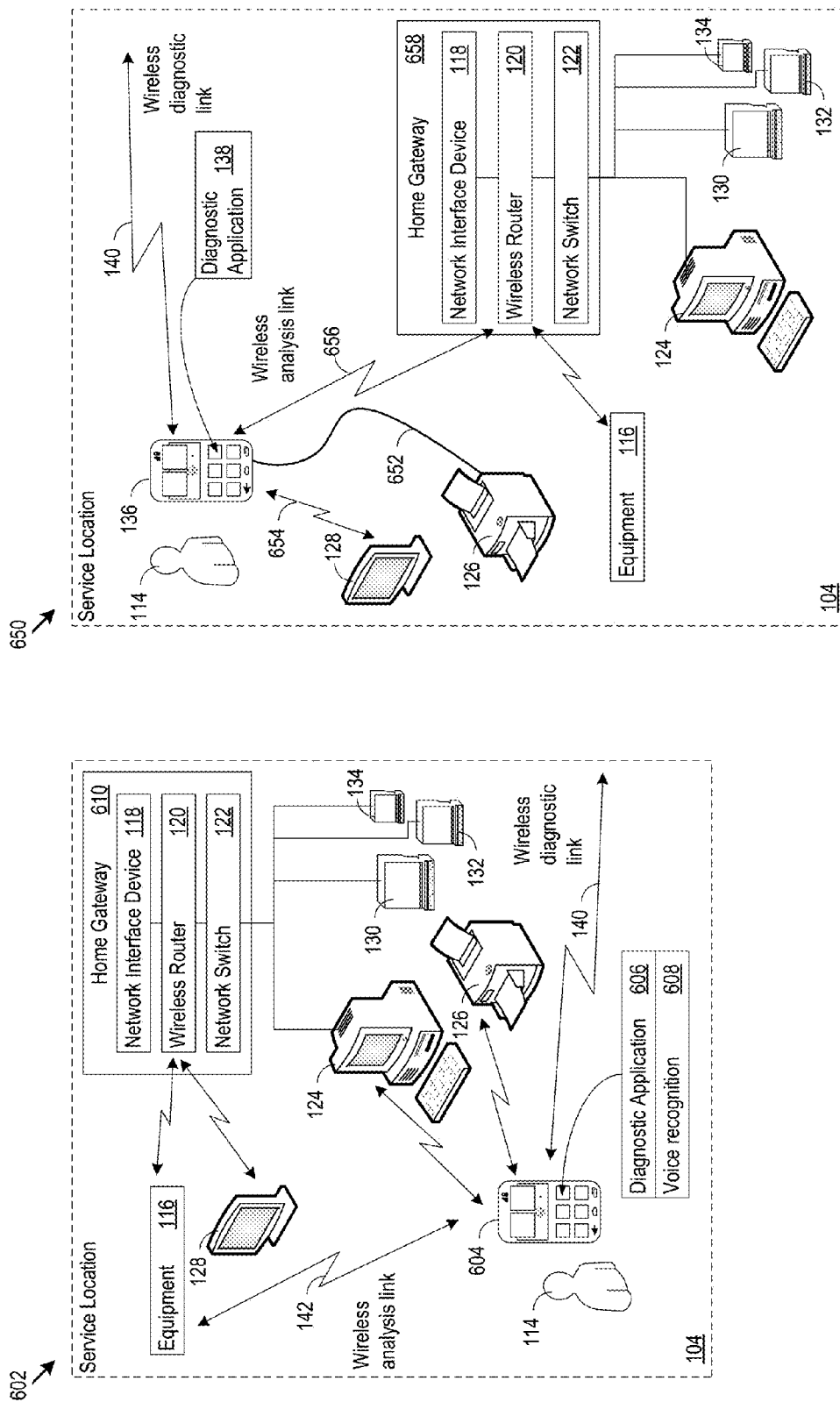
FIG. 6 shows additional examples of network diagrams.

FIG. 6 shows additional examples of network configurations 602 and 650. In the configuration 602, the diagnostic device 604 includes a diagnostic application 606 extended to include any functionality provided by the management system 102. For example, the diagnostic device 604 may implement a voice recognition application 608 that provides voice driven troubleshooting of any DUT, executed directly on the diagnostic device 604. Thus, the diagnostic application 606 may provide an expert system using any combination of voice, touch, and other input for troubleshooting in addition to, or instead or, troubleshooting performed over the wireless diagnostic link 140.

The configuration 602 also shows that any of the network interface components may be part of a consolidated device. In particular, the configuration 602 shows a home gateway 610. The home gateway 610 includes the functionality associated with the network interface device 118, the wireless router 120, and the network switch 122. The home gateway 610 may be a single device provided and managed by the network operator, for example. The home gateway 610 may vary widely in functionality. For example, the home gateway 610 may or may not include the wireless router 120 or the network switch 122. In addition, the home gateway 610 may include additional functionality, such as a Digital Video Recorder (DVR), Network Attached Storage (NAS), audio/video streaming device, or other device.

FIG. 6 also shows another example configuration 650. In the configuration 650, the diagnostic device 136 obtains diagnostic information from a DUT, in this case the printer 126, over a wired connection 652. That is, in addition to using wireless connections such as Bluetooth and NFC, the diagnostic device 136 may obtain diagnostic information over cabled (e.g., wired or optical) connections, such as a USB, parallel, proprietary (e.g., a Lightning connector or iPhone™ 30-pin connector), Mobile High Definition, FireWire, or other type of cabled connection.

The example configuration 650 also shows another connectivity option. In particular, the diagnostic device 136 may provide a tethered connection 654 for any given DUT. In the example shown, the display 128 connects to a network via the tethered connection 654, with the diagnostic device 136 then acting as an access point to the network. As a result, the diagnostic device may obtain diagnostic information from the display 128 over the network link supported by the tethered connection 654. The diagnostic device 136 may provide such a connection when, for example, the wireless router 120 is not available, e.g., is powered off, or is malfunctioning, or is not present at all.

Note also that the diagnostic device 136 may also make connections to the DUTs over different types of wireless analysis links, such as a wireless network (e.g., WiFi or WiMax) link 656. That is, in addition to other types of wireless analysis links (e.g. Bluetooth and NFC), the diagnostic device 136 may attach to the wireless router 120 as a client, obtain a network address, and communicate over the network with the DUTs. As a result, the diagnostic device 136 may also obtain diagnostic data by sending queries over the network in place at the service location 104 to network connected devices at the service location 104. The example configuration 650 also shows a scenario in which a home gateway 658 includes the functionality of the network interface device 118, wireless router 120, and network switch 122. However, as explained above, the network interface device 118, wireless router 120, and network switch 122 may be separate devices instead, and additional, fewer, or different devices may be included in the home gateway 658.

In some implementations, the diagnostic device 136 may include a custom hardware or software configuration that facilitates the diagnostic techniques discussed above. As one example, the diagnostic device 136 may include a dedicated set of circuitry (e.g., a processor and firmware) dedicated to establishing any of the links described above, obtaining diagnostic information, providing diagnostic instructions, and the like. The dedicated circuitry may, for example, be separate and apart from the general purpose CPU and memory resources that the diagnostic device uses to run applications, make phone calls, handle WiFi or Bluetooth data connections, and the like. The management system 102 may then attach to the diagnostic device 136 through the dedicated circuitry, independently of other tasks and connections that the diagnostic device 136 may be running or handling. In other implementations, the diagnostic device allocates diagnostic activities to a particular core among the multiple cores present in CPU. The diagnostic device 136 may, for example, reserve a particular core for diagnostic activities to ensure that the activities have the hardware support needed to run at any given moment.

Discussed below are further aspects of the on-premises diagnostic, management, and self-installation (DMS) capabilities for customer premises equipment (CPE).

Figure 7:
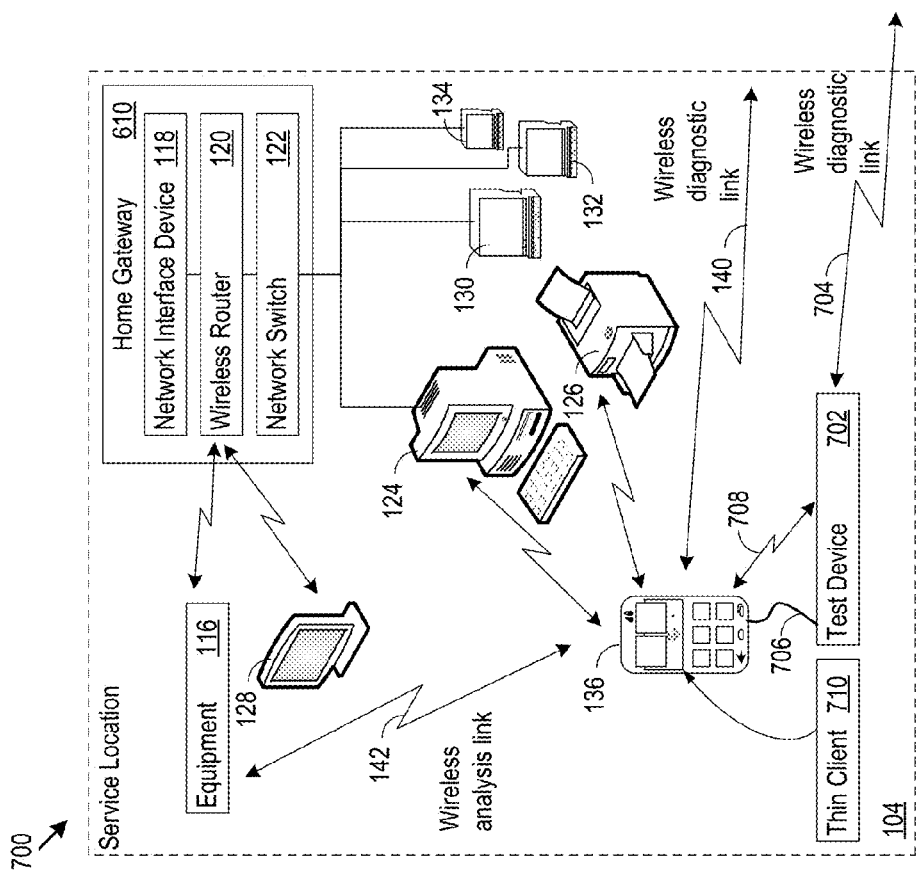
FIG. 7 shows another example of a network diagram.

FIG. 7 shows another example of a network diagram 700. Note that one aspect of the DMS capabilities is the use of cellular channels for remote coordination of the DMS interactions with the CPE. For instance, the wireless diagnostic link 140 may be a cellular telephony link, including, as a few examples, a GSM, 2G, 3G, or 4G/LTE link. FIG. 7 also shows that test devices 702 may be used at the service location 104. The test devices 702 may be network analyzers, line testers, signal analysis and diagnostic devices, or any other device for testing any of the CPE. The test device 702 may itself include a cellular radio that supports a cellular channel 704 for communication with the management system 102 or any other DMS system in the cloud of connected devices. In other situations, the test device 702 may communicate over a wireless connection 708 (e.g., via Bluetooth) or over a wired connection 706 (e.g., via USB) with another device (e.g., the diagnostic device 136) that provides the cellular channel. That is, the other device may send and receive test results and other information over the wireless channel 140 on behalf of the test device 702. More generally, the test device 702 may communicate with the diagnostic device 136 over any type of tethered connection. Further, the test device 702 may perform any management action other than test actions, including content management, device configuration, software management or other actions on target devices at the service location 104.

Regarding the diagnostic application 138, several implementation options are possible. As one example, a download/push mechanism may send the diagnostic application 138 to the diagnostic device 136, with or without notification to the user of the diagnostic device 136. One mechanism for preforming the push is an over-the-air update of the type that delivers new firmware or operating system upgrades to cellular phones. The diagnostic application 138 may be the particular data item pushed to the phone, or the diagnostic application 138 may be included as an application that is part of a larger data package (e.g., an operating system upgrade) sent to the diagnostic device 136. The push may be from a remote location and may include a key, such as a decryption key, or any other access, authorization, or authentication key.

As another example, the diagnostic application may be pre-installed on the diagnostic device 136. In that respect, part or all of the diagnostic application may be secured in the diagnostic device 136, e.g., located in a secure kernel, encrypted, protected by an authorization or authentication mechanism, or otherwise sequestered in the diagnostic device 136. The management system 102 (or any other DMS system) may then unlock the diagnostic application 138 for execution by sending, e.g., a decryption key, password, or other access information, without the need to push the diagnostic application 138 to the diagnostic device 136.

In other implementations, an authorization key for the diagnostic application 138 may be provided on or with the equipment for the CPE itself, e.g., as a PIN number on a router or LCD display. The diagnostic application 138 may execute in whole or in part in a secured execution environment within the diagnostic device 136. The secured execution environment may limit or prevent access to the diagnostic application and its data by other applications running on the diagnostic device 136. In other implementations, security may be accomplished by Near Field Communication (NFC) techniques. For instance, the diagnostic device 136 may permit execution of the diagnostic application 138 when the diagnostic device 136 is in near field communication with a CPE, or with any other authorization or authentication device in the service location 104.

As yet another example of provisioning the diagnostic application 138, the download, installation, and/or execution of the diagnostic application 138 may be responsive to a message, such as an email, SMS message, or other communication containing a link for the download, installation, or execution. Such an email may originate from the management system 102 or other remote location, for example. The diagnostic application 138 may be available on an application storefront for free acquisition, or purchase, and download to the diagnostic device 136. The application storefront may deliver the diagnostic application 138 to the diagnostic device 136 through a data connection, e.g., an IP based WiFi connection, through a 3G/4G/LTE data connection, or in other ways.

In some implementations, a network operator may verify execution rights of the diagnostic application 138 against data in the SIM in the diagnostic device 136. For instance, the management system 102 may verify that the current SIM card serial number matches a registered SIM card number for the diagnostic device 136 prior to pushing the diagnostic application 138, prior to executing the diagnostic application 138, or prior to carrying out any DMS functionality.

The diagnostic device 136 may also implement authentication and security functions with respect to the diagnostic application 138 and the CPE. The diagnostic application 138 may be configured for temporary access, e.g., for diagnostic purposes. The diagnostic device 136 may implement a diagnostic trusted zone, which may selectively permit the diagnostic application 138 to execute. Note that any technician management channel may support the delivery and execution of the diagnostic application. That is, the management system 102 is just one source of the diagnostic application 138; the diagnostic application 138 may originate from other devices and systems, such as mobile technician devices operating anywhere in the field.

Other aspects of security include digital signature authentication, e.g., of any of the gateways and the diagnostic device 136. The authentication may occur prior to installation or execution of the diagnostic application 138. The authentication may include SIM serial number or Mobile Device Management (MDM) factors or information. The system may provide customer account privacy, e.g., through data hiding or obfuscation, regardless of where the customer account data is located (e.g., on the CPE or on the diagnostic device 136). Authentication or authorization keys may be provisioned, protected, and linked to a particular customer account, e.g., a customer of internet service supported through the network interface device 118 at the service location 104. Any communication channel (e.g., NFC, cellular, USB, or WiFi channel) between the diagnostic device 136, CPE, management system 102, or any other system may be secured, e.g., by encrypting the data sent over the channel. The secure communication channels may also include a secure channel between the SIMs on the diagnostic device 136 and the management system 102, or any other DMS system in the cloud of systems in communication with the network device 136. The diagnostic device 136, CPEs, or DMS systems may detect and report unauthorized (e.g., malicious) attempts to access the diagnostic application 138 or the CPEs at the service location 104, e.g., to the management system 102 or any other DMS or MDM system through a secure or unsecured channel.

In some implementations, the diagnostic application 138 may obtain and respond to customer profile information. The customer profile information may be stored in the management system 102 or any other remote system in the cloud of devices with which the diagnostic device 136 communicates. From the customer profile information, the diagnostic application may determine the device environment in place at the service location 104, and the particular characteristics of any given CPE in question. The customer profile information (e.g., model number, firmware version, device identifiers, service package, street address, and the like) may determine in whole or in part which DMS actions are executed, how they are executed, and what the results should be.

In some implementations, the diagnostic application 138 may perform CPE or service discovery, including querying CPEs for connected device information. In this manner, the diagnostic application 138 may build sections of the customer profile and return the customer profile to the management system 102 for use in future DMS activities.

The system may implement application partitioning. For instance, the diagnostic device 136 may implement a thin client 710. The thin client 710 may include, as one example, user interfaces and DMS functions that interact with the CPEs, while the network (e.g., the management system 102) may implement comparatively more extensive or complex logic to, e.g., receive test data, perform DMS analysis, determine courses of action, send execution instructions to the diagnostic device 136, and otherwise monitor and execute DMS functions through the diagnostic device 136. In other implementations, the thin client 710 performs as a proxy layer to simply forward DMS data through the diagnostic device 136. In this case, the CPE may execute the DMS functions and send the results to the thin client 710. The thin client 710 relays the results to the management system 102, which performs the analysis on the results obtained through the thin client 710.

The DMS activities may be supported by parallel IP based sessions. For instance, the diagnostic device 136, management system 102, technician, or any combination thereof may execute a DMS session with more than one CPE simultaneously, e.g., to send test data between CPEs and observe the results. In another aspect, there may be several different paths or gateways to the management system 102 (or other external diagnostic or control system) from the service location 104, any of which may be used individually or in parallel. The gateways may include an electrical network interface (e.g., a smart-grid interface), the network interface device 118, neighboring WiFi access point, femtocell, or a WAN into the service location 104. Several examples are described below with respect to FIG. 8.

Further, the DMS actions may execute in parallel. There may be multiple management systems 102, diagnostic devices 136 or diagnostic applications 138 running in parallel. In that regard, multiple different DMS agents may collaborate in parallel to perform the DMS actions, e.g., a network configuration agent, a firmware upgrade agent, and a network test packet generator agent running in parallel.

The diagnostic device 136 and the CPEs may execute any desired link and DMS protocols. The diagnostic device 136 and the CPEs may support the link and DMS protocols with specific data structures that facilitate the DMS activities. Furthermore, when the diagnostic application 138 executes, it may ascertain whether the diagnostic device 136 has the drivers, interfaces, or other software components that may be needed to communicate with the CPE. If not, the diagnostic application 138 may automatically download and install such drivers, or direct the user to a network location where such drivers may be found and downloaded for installation. Note that the drivers may be obtained from the CPE itself over any communication path in place between the diagnostic device 136 and the CPE. Furthermore, the CPEs may themselves provide the diagnostic application 138 for execution by the diagnostic device 136. In that respect, the diagnostic device 136 need not obtain the diagnostic application 138 via a remote push operation, but may instead obtain the diagnostic application 138 locally from the CPE via any available communication channel to the CPE.

In some implementations, the CPE may autonomously detect issues, and initiate any DMS action, or initiate communication with the diagnostic device 136 or management system 102. That is, the CPE may initiate a DMS action when it detects an issue that DMS actions can resolve.

Note that the diagnostic data sent or received over the wireless diagnostic link 140 may include both real time streaming and non-real time cached data flows. The diagnostic device 136 may perform data gathering as a background task or in response to an event trigger (e.g., loss of Internet connectivity).

Other types of DMS actions include monitoring latency and responsively adjusting any of the network devices (e.g., the router 120 or switch 122) dynamically to reduce latency (or achieve a different quality goal) for a specific pathway. More generally, the diagnostic device or CPEs may also predict behavioral issues in the network and perform proactive adjustments to avoid the occurrence of the issues. The management system 102 or any other device along the network path may monitor and assist with cellular handovers for the diagnostic device 136, and may further implement specific routing for specific application data streams. For instance, a video data stream may be routed over a high bandwidth, low latency path, while a camera audio sensor stream may be routed over a lower bandwidth path.

The DMS analysis and actions are not limited to any particular device at the service location 104 (e.g., the home gateway 610). The diagnostic application 138 may be designed for analysis of any CPE that may be present. Note also that the diagnostic application 138 may have a distributed architecture and may therefore have hardware and software modules that reside in whole or in part at multiple locations or within multiple devices (e.g., within the diagnostic device 136, the home gateway 610 and any of its elements, the management system 102, or any other location (e.g., in a cloud-connected device)).

Again, any of the DMS analysis may run autonomously, and if a problem is found or anticipated, the analysis modules may search and locate instructions for the related network elements and perform the DMS action without user intervention (e.g., in the transparent mode explained above). The analysis modules may notify the user of the issue, and may interrupt the DMS action to ask for manual intervention. Further, the diagnostic application 138 may learn and update the DMS actions, including the particular DMS instructions and sequences. This may be based upon a history log of which instructions and sequences worked and which did not work, on data from CPE manufacturers, on remote knowledge bases, or on other sources of information.

In some implementations, the diagnostic device 136 (e.g., a smartphone) may operate as an access point, e.g., and 802.11 access point. In that respect, the diagnostic device 136 may redirect diagnostic traffic to other devices, e.g., such as a television, laptop computer, or another smartphone, in order to act as a temporary gateway to route traffic around non-functional equipment until that equipment is fixed.

Figure 8:
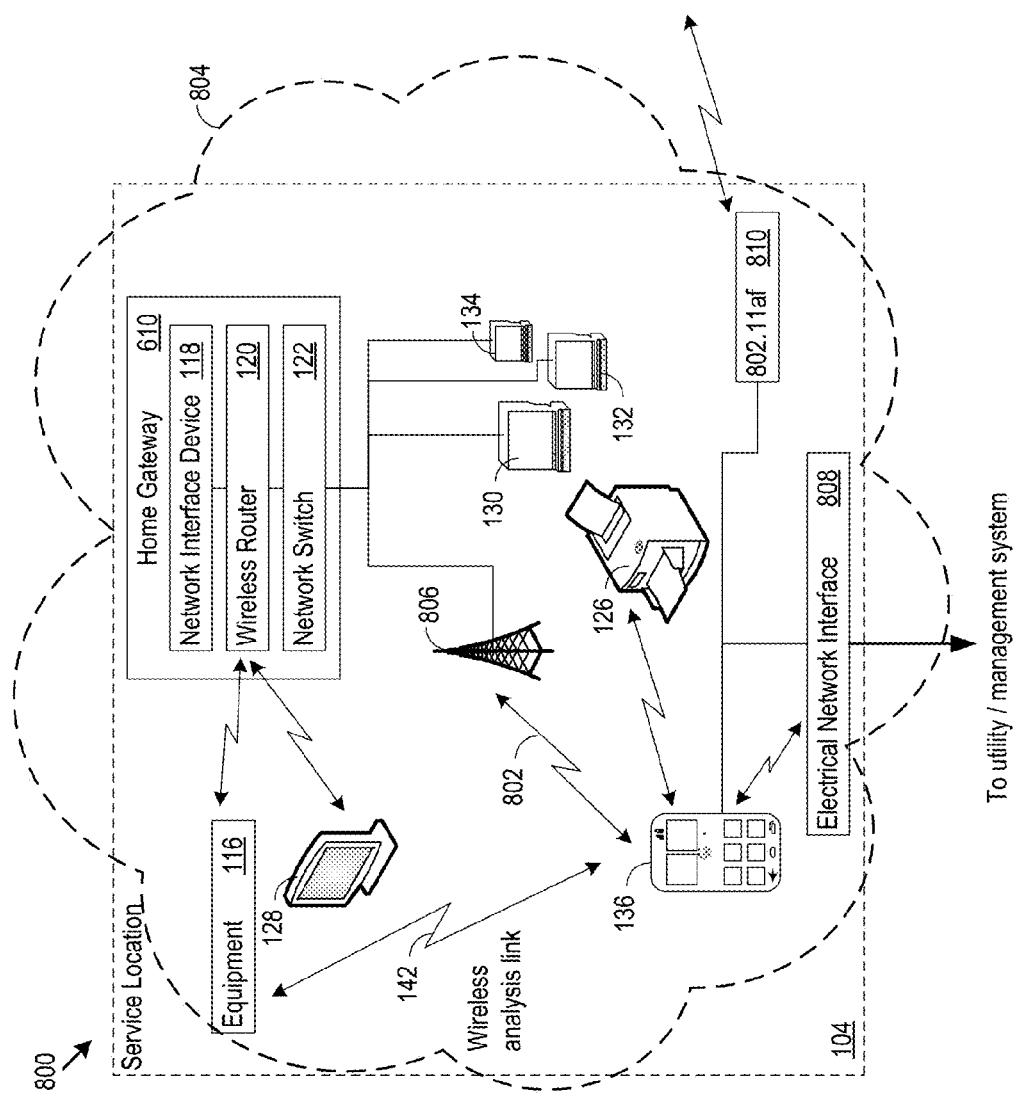
FIG. 8 shows another example of a network diagram.

FIG. 8 shows another example network diagram that illustrates additional implementation options. In FIG. 8, the cellular channel 802 (e.g., the wireless diagnostic link) is made to a local femtocell 804. A femtocell basestation 806 (e.g., a low transmit power evolved Node B (eNB)) generates the femtocell 804. The femtocell 804 may provide local cellular coverage for all or parts of a home or office, as examples. The femtocell basestation 806 may perform the functions of a cellular basestation, for example, according to the 3GPP or 4G/LTE standards.

As just one example, the femtocell 804 may have footprint range from about 10s to 100s of meters, e.g., between 10 and 200 m. In a residential environment, the femtocell 804 may support, e.g., 2 to 4 active calls. The femtocell 804 increases the coverage area provided by macrocells generated by full scale outdoor base stations, and may improve data throughput and voice quality. The femtocell 804 may further reduce uplink transmission power requirements from the UE 100, because the femtocell basestation 806 is much closer, and may therefore improve the battery life of the diagnostic device 136.

FIG. 8 also shows an electrical network interface 808 present in the service location 104. The electrical network interface 808 may include a power line network interface (e.g., an Ethernet over power line interface), a smart grid interface, or other interface that supports data transmission over the electrical network. The electrical network may connect back to the utility and to other locations, including the management system 102. Accordingly, the diagnostic device 136 may exchange DMS information with other systems using any of a variety of gateways that are available.

Another example of a gateway is an 802.11af White-Fi access point 810. The 802.11 of access point supports exchange of the DMS information in unused television spectrum. Additional examples of gateways through which the diagnostic device 136 may exchange information include near field communications (NFC) interfaces, USB On The Go (USB OTG) interfaces, and phone line (e.g., RJ-11) interfaces (e.g., over a modem). The diagnostic device 136 may select a gateway based on reliability statistics, latency statistics, or other selection criteria. Further, as noted above, the communication pathways for the SDM information need not be real-time pathways. In that respect, the diagnostic device may obtain and save SDM information such as test results, troubleshooting actions, test applications, or other information on memory sticks, SIM cars, flash memory cards, and other memory devices that may be transported to an analysis location for review of the information, updating the information, and preparing the information for later return to the service location 104 where it may be applied to CPE.

Note also that some or all of the DMS communications may be done in-band in any selected communication channel. The in-band communications may be chosen according to the available bandwidth. As one example, the in-band communications may be relatively slow compared to a dedicated channel for the communications, but still sufficient for remote DMS purposes.

The DMS techniques described above were given in the example context of a home or office. However, the DMS techniques, including gateway options and cellular channel communications, apply to other contexts as well. For instance, the DMS techniques apply in vehicles such as cars, ships, and planes, industrial settings (e.g., on the factory floor), and any other private, public, or government location.

In many instances, the malfunctioning CPE is connected to other devices in the network, e.g., the router 120 is in communication with the switch 122. Each device in communication with the CPE may be directed (e.g., by the diagnostic device 136), to load or save test data, to execute tests on the CPE, to send instructions to the CPE (e.g., reboot or execute a built in self-test), and return results to the diagnostic device 136 or through the diagnostic device 136. Furthermore, the CPEs may be designed with separate, isolated, or protected communication subsystems to reduce or eliminate the failure impacts of different communication systems in the CPE on one another. For instance, the electrical interface, cellular interface, and WiFi interfaces may be implemented as physically separate modules to reduce the likelihood that failure of one would result in failure of another.

With the DMS capabilities, there may be multiple different types of management application functionality. The functionality may be present in a single application, or may be distributed or partitioned across multiple distinct applications. As examples, there may be functionality specific to addressing network optimization, network security, malfunctions, power saving configurations, high performance mode configurations, routine maintenance, testing, device setup, software/firmware installation, device programming, device upgrades, or other functionality applicable to a CPE. Within network optimization, for example, there may exist functionality for selecting and setting channel assignments, adjusting output power levels, performing interference detection, performing load balancing, performing latency reduction, reducing power consumption, or other functions.

In other implementations, the CPE include built in self-test (BIST) functionality that may interact with the diagnostic device 136. For example, the BIST may communication test results to the diagnostic device 136 and receive configuration, repair, diagnosis, or other DMS directions from the diagnostic device 136. The BIST functions may implement test patterns coordinated among one or more of the CPEs. The test patterns may test multiple different paths through the network that connects the CPEs, and test any desired functionality at any CPE along the path. Each instance of BIST may communicate test results back to the management system 102, or any other remote system located anywhere in the cloud of network connected devices able to communicate with the BIST functions. In that respect, the DMS analysis need not be performed at the management system 102, but may be performed in whole or in part in any system in the cloud of network devices able to communicate with the CPE.

Noted above was a transparent mode of operation for DMS activity. Other aspects include execution of DMS activities through nearby devices. For instance, diagnostic devices in the vicinity (e.g., smartphones at neighboring locations) may be activated to troubleshoot CPEs at the service location 104, or at the location where the diagnostic device is actually located. The neighboring diagnostic devices may attach to and communicate through network resources in the service location 104 to run DMS activities on the CPEs.

Regarding diagnostic devices in the vicinity, those devices and others may form a constellation of diagnostic devices, all or some or which may execute part of the DMS activities. Any of the diagnostic devices may perform discovery, construction, and updating of device maps that the diagnostic devices may communicate back to the management system 102. The device maps may include any devices discovered by the diagnostic devices, as well as location information (e.g., GPS or WiFi based locations) that geographically locates those discovered devices. That is, the diagnostic device 136 may send geographical device mapping information discovered by the diagnostic device 136 through the cellular communication channel to the management system 102. The device discovery may happen autonomously, or a periodic basis, or responsive to user direction and command. The information returned to the management system 102 may also include environmental characteristics sensed by the diagnostic device 136. As just a few examples, the diagnostic device 136 may return WiFi strength or quality measurements, cellular signal strength or quality measurements, and access point identifiers (e.g., SSIDs) to the management system 102, along with location information. As a result, the management system 102 may build over time a geographic map of devices, environmental characteristics, and other information sensed by any number of diagnostic devices 136 operating at any geographic locations, including the service location 104.

Regarding diagnostic devices 136 in the service location 104, they may activate upon user command, or may activate on a more persistent basis. For instance, the diagnostic devices 136 may activate the diagnostic application 138 on a regular basis, e.g., on a periodic schedule or continuously running in the background. The DMS activities may therefore occur on a proactive basis, rather than a reactive basis in response to problems with the CPEs.

As noted above, the techniques described in this application may perform a full range of management actions on the entire range of equipment 116. As examples, the equipment 116 may include a home stereo, television, refrigerator, microwave, exercise machine, washer or dryer, or home security system. As additional examples, the equipment may be a portable gaming device, audio/video controllers, or computer system, climate control system (e.g., air conditioning and furnace), televisions, stereos, amplifiers, speakers, or any other type of electronic device.

The management actions are not limited to diagnosis, fault detection, and repair. Instead, the management actions may extend to content management, software management, device control, and beyond. Accordingly, in some implementations, the diagnostic device 136 performs functions other than diagnosis, troubleshooting and repair. For instance, the diagnostic device 136 may be part of a recognized ecosystem of devices within the service location, with the ecosystem defined according to matching or common identifiers, e.g., queried, sent, or received over Bluetooth, to identify specific manufacturers, device types, or device functional characteristics. As a specific example, the diagnostic device 136 may automatically recognize, establish communications with, and cooperate with devices at the service location produced by a common manufacturer. Thus, for example, a smartphone diagnostic device may cooperate automatically with a television from a common manufacturer over any of the communication channels previously described (e.g., Bluetooth). The smartphone may then share pictures to the television, function as a remote control for the television, set parental controls or other audio or video processing options, provide a channel for firmware upgrades for the television, launch diagnostic queries to the television, or otherwise interact with the television.

The example above is a specific example of generalized tethering. That is, the diagnostic device 136 may establish, either manually or automatically, links with any devices at the service location. In that regard, the diagnostic device 136 provides a type of universal management platform, e.g., for a family of products related by any selected criteria (e.g., by manufacturer).

One result is that the diagnostic device 136 then provides part of the communication link into the service location, over a more secure connection, the cellular connection (e.g., over 3G/4G/LTE), as compared to a WiFi connection, for example. Therefore, a remote management system 102 may more securely reach into the service location to perform any selected management actions, automatically or with manual assistance, on the devices in the service location, with the secure cellular connection through the diagnostic device 136 made as an integral part of the overall communication channel. In that respect, the cellular connection may act as the sole or primary channel, as opposed to a secondary or auxiliary channel.

Note also that a sensor system available on the diagnostic device 136 may also contribute to device management. For instance, the diagnostic device 136 may capture images or video with a still camera or video camera, capture or scan 1D, 2D, or other bar codes on the device being managed, and capture or scan any other indicia (e.g., model names, serial numbers, and manufacturer names), and communicate the images, bar code data, or other indicia to the remote management system 102. The management system 102 may index the indicia into a database of known equipment, determine which equipment is being managed, and communicate accordingly with the individual at the equipment location. For example, the management system 102 may communicate, e.g., through the smartphone application, an identification of the device, and prompt the individual to confirm that the identified device is indeed the that the individual desires to manage. Upon confirmation, the management system 102 may then proceed with any specified management or troubleshooting action on the device.

Further, the management system 102 may accept the indicia as part of a security process. As one example, the indicia may serve as authentication that the individual who is requesting management or troubleshooting may actually do so. In one aspect, the indicia may serve to indicate that the individual is physically present with the device. That is, the individual is not an unauthorized party connecting through a remote WiFi or other network connection and who is attempting to improperly modify device operation.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The DMS processing capability may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

What is claimed is:

1. A management device comprising:
   a processor;
   a cellular transceiver; and
   a memory in communication with the processor and the cellular transceiver, the memory comprising:
   control instructions that when executed by the processor cause the processor to:
      establish a cellular communication channel between a management system and the management device, located at a service location;
      receive a management application pushed from the management system;
      determine customer premises equipment (CPE) at the service location that shares an ecosystem identifier with the management device;
      establish a local communication link between the management device and the CPE at the service location; and
      manage the CPE at the service location by:
         determining, using the management application, a programming version for the CPE;
         sending an indication of the programming version to the management system;
         after sending the indication, receiving a programming update for the CPE from the management system at the management device over the cellular communication channel; and
         responding to receipt of the programming update by sending the programming update over the local communication link to the CPE.

2. The device of claim 1, where the ecosystem identifier comprises a manufacturer identifier.

3. The device of claim 1, where the ecosystem identifier specifies a device functional characteristic.

4. The device of claim 1, where the control instructions are further configured to cause the processor to manage the CPE by further receiving management instructions over the cellular communication channel.

5. The device of claim 4, where the management instructions comprise diagnostic queries for the CPE.

6. The device of claim 1, where the control instructions are configured to manage the CPE without notification on a user interface of the management device.

7. The device of claim 4, where the management instructions comprise content management instructions.

8. A method comprising:
   establishing a cellular communication channel between a management system and a management device located at a service location;
   installing a management application responsive to a communication pushed from the management system;
   determining customer premises equipment (CPE) at the service location that shares an ecosystem identifier with the management device;
   establishing a local communication link between the management device and a the CPE; and
   managing the CPE at the service location by:
      determining, using the management application, a programming version for the CPE;
      sending an indication of the programming version to the management system;
      after sending the indication, receiving a programming update for the CPE from the management system at the management device over the cellular communication channel; and
      responding to receipt of the programming update by sending the programming update over the local communication link to the CPE.

9. The method of claim 8, further comprising executing the management application on the management device to receive management instructions from the management system.

10. The method of claim 8, further comprising:
    establishing the cellular communication channel through a cellular radio in the management device.

11. The method of claim 9, where:
    the management instructions comprise test instructions for the CPE at the service location.

12. The method of claim 9, where:
    the management instructions comprise device configuration instructions for the CPE at the service location.

13. The method of claim 8, where:
    the communication comprises a management application link; and
    installing the management application comprises executing the management application on the management device responsive to activation of the management application link.

14. A management device comprising:
    a processor;
    a cellular transceiver; and
    a memory in communication with the processor and the cellular transceiver, the memory comprising:
    control instructions that when executed by the processor cause the processor to:
       establish a cellular communication channel between a management system and the management device, located at a service location;
       install a management application responsive to a communication pushed from the management system;
       establish a local communication link between the management device and a customer premises equipment (CPE) also located at the service location; and
       manage the CPE at the service location by:

determining, using the management application, a programming version for the CPE;

sending an indication of the programming version to the management system;

after sending the indication, receiving a programming update for the CPE from the management system at the management device over the cellular communication channel;

responding to receipt of the programming update by sending the programming update over the local communication link to the CPE;

receiving a management response from the CPE over the local communication link at the management device; and returning the management response to the management system over the cellular communication channel.

15. The device of claim 14, where:

the control instructions are further configured to cause the processor to manage the CPE by further receiving management instructions over the cellular communication channel.

16. The device of claim 15, where:

the management instructions comprise device configuration instructions for the CPE at the service location.

17. The device of claim 14, where:

the control instructions are configured to manage the CPE without notification on a user interface of the management device.

18. The device of claim 14, where:

the control instructions are configured to manage the CPE automatically and without input from a user interface of the management device.

19. The device of claim 14, where:

the control instructions are configured to establish the cellular communication channel between the management system and the management device automatically and without input from a user interface of the management device.

20. The device of claim 14, where:

the communication comprises an application link to the management application; and the control instructions are further configured to cause the processor to install the management application by responding to selection of the application link by downloading and executing the management application.

* * * * *